United States Patent

Hamai et al.

[11] Patent Number: 6,122,280
[45] Date of Patent: Sep. 19, 2000

[54] PACKET OUTPUT DEVICE AND PACKET OUTPUT METHOD

[75] Inventors: Shinji Hamai, Osaka; Hidetoshi Takeda, Neyagawa, both of Japan; Makoto Asano, Nurunberg, Germany

[73] Assignees: Matsushita Electric Industrial Co. Ltd., Kadoma, Japan; U.S. Philips Corporation, New York, N.Y.

[21] Appl. No.: 08/692,710

[22] Filed: Aug. 6, 1996

[30] Foreign Application Priority Data

Aug. 11, 1995 [JP] Japan ................................ 7-227557

[51] Int. Cl.[7] ...................................... H04J 3/24
[52] U.S. Cl. ..................... 370/395; 370/394; 370/476; 370/503; 370/522
[58] Field of Search ..................... 370/395, 392, 370/400, 407, 473, 474, 476, 503, 509, 516, 398, 402, 455, 394, 522

[56] References Cited

U.S. PATENT DOCUMENTS

| 4,701,911 | 10/1987 | Ulug | 370/455 |
| 4,751,697 | 6/1988 | Hunter et al. | 370/400 |
| 4,845,709 | 7/1989 | Matsumoto et al. | 370/503 |
| 5,042,032 | 8/1991 | Dighe et al. | 370/398 |
| 5,495,482 | 2/1996 | White et al. | 370/473 |
| 5,740,174 | 4/1998 | Somer | 370/402 |

FOREIGN PATENT DOCUMENTS 4362827  12/1992  Japan .

OTHER PUBLICATIONS

Kunzman et al, IEEE, Chicago, Aug. 1995, vol. 14, No. 13, pp. 893–900, "1394 High Performance Serial Bus: The Digital Interface for ATV."

*Primary Examiner*—Douglas W. Olms
*Assistant Examiner*—Shick Hom
*Attorney, Agent, or Firm*—Renner, Otto, Boisselle & Sklar

[57] ABSTRACT

A packet output device for formatting serial data into packets and for transmitting resulting data packets includes a data packet generator for generating each data packet and for generating time data corresponding to the data packet, the time data defining an output time of the data packet, and a packet transmitting circuit for receiving the data packet and the corresponding time data and transmitting the data packet based on the corresponding time data.

16 Claims, 10 Drawing Sheets

FIG. 5

| Cycle | Cycle start time |
|---|---|
| $C_1$ | 10 |
| $C_2$ | 20 |
| $C_3$ | 30 |
| $C_4$ | 40 |
| $C_5$ | 50 |
| $C_6$ | 60 |
| $C_7$ | 70 |
| $C_8$ | 80 |
| $C_9$ | 90 |

FIG. 6

| Data packet $P_i$ | Time data $TD_i$ | | Available cycle $C_j$ |
|---|---|---|---|
| | Transmission start time $t_S$ | Transmission end time $t_E$ | |
| $P_1$ | 16 | 29 | $C_2$ |
| $P_2$ | 32 | 45 | $C_4$ |
| $P_3$ | 48 | 61 | $C_5, C_6$ |
| $P_4$ | 64 | 77 | $C_7$ |
| $P_5$ | 80 | 93 | $C_8, C_9$ |

FIG. 7

| Data packet $P_i$ | Time data $TD_i$ | | Available cycle $C_j$ |
|---|---|---|---|
| | Transmission start time $t_S$ | Transmission width $t_W$ | |
| $P_1$ | 16 | 13 | $C_2$ |
| $P_2$ | 32 | 13 | $C_4$ |
| $P_3$ | 48 | 13 | $C_5, C_6$ |
| $P_4$ | 64 | 13 | $C_7$ |
| $P_5$ | 80 | 13 | $C_8, C_9$ |

PACKET OUTPUT DEVICE AND PACKET OUTPUT METHOD

BACKGROUND OF THE INVENTION

1. Field of the Invention

The present invention relates to a data transmitting device for formatting data into packets and transmitting the data packets. In particular, the present invention relates to a packet output device for reducing the load of a packet generator of the data transmitting device by adding transmission time data to the data packets.

2. Description of the Related Art

In digital data communication, data transmission is generally performed using a packet as a unit of data. An IEEE 1394 interface is one of such interfaces performing data communication using packets. The IEEE 1394 is a serial interface having a high data transmission rate for the next generation multimedia standardized by the IEEE (for example, refer to High Performance Serial Bus P1394/Draft 8.0 v2). At present, an IEEE 1394 interface has been developed for use in digital audio visual (AV) equipment.

The IEEE 1394 can transmit two types of packets, i.e., isochronous packets for transmitting data which requires real-time transfer and asynchronous packets for transmitting data which does not require the real-time transfer. For example, digital audio visual (AV) data is communicated in the isochronous transfer mode using common isochronous packets.

In order to determine a buffer size for transmitting and receiving data requiring real-time transfer, it is necessary to determine a packet transmission timing, i.e., a maximum delay time permitted for the transmission. In the case of transmitting AV data using the IEEE 1394 interface as well, such transmission timing is determined by a range of the permitting time period in which each packet can be transmitted.

In general, in a packet output device, one packet per predetermined unit time which is referred to as a cycle is output to a transmitting path in an isochronous transfer mode based on the IEEE 1394 standard. For example, when a data rate is 28.8 Mbps, 250 data packets and 16 to 17 vacant packets are output for ⅓₀ second. Each data packet contains 480 bytes of data, and each vacant packet contains no data. The generated packets (data packets and vacant packets) are output from the packet output device.

A conventional packet output device 300 and operations thereof will be described with reference to FIGS. 1 and 2. FIG. 1 is a block diagram showing a basic structure of the conventional packet output device 300. The packet output device 300 includes a packet generator 31, a packet transmitting circuit 32 and a clock signal generator 33.

The clock signal generator 33 outputs, for example, a clock signal having a predetermined cycle, which defines clock time for the system of the packet output device 300. The packet generator 31 generates, for example, one data packet or vacant packet per 125 μs (8 kHz) based on the clock time which is defined by the clock signal output from the clock signal generator 33. The packet generator 31 outputs the generated packets to the packet transmitting circuit 32. The packet transmitting circuit 32 receives the packets and then outputs the packets to the transmitting path 34 in accordance with a predetermined transmission cycle C.

FIG. 2 is a timing chart showing an exemplary packet arrangement on the transmitting path 34. As shown in FIG. 2, a time period of each transmission cycle C is 10 t, where t is a predetermined unit of time (e.g., one cycle of a clock signal). In FIG. 2, each cycle C is shown as cycle $C_j$ (j=1, 2, 3, . . . .), and each cycle $C_j$ starts from a time (10×j)t. The transmitting path 34 is typically shared with another device such as a terminal, and it is assumed that the transmitting path 34 is busy from cycles $C_3$ to $C_5$ because of the transmission of data from the other device, as shown in FIG. 2.

The packet generator 31 generates one data packet $P_i$ (i=1, 2, 3, . . . ) every time period of 16 t, i.e., time width 16 t. Each generated packet $P_i$ can be transmitted within a time width 13 t to the transmitting path 34 via the packet transmitting circuit 32. For example, the first data packet $P_1$ is required to be output from the packet transmitting circuit 32 to the transmitting path 34 during a time period from the time 16 t to the time 29 t. Accordingly, the data packet $P_1$ is output in the cycle $C_2$ which is available in this time period. Accordingly the output of the data packet $P_1$ starts at time 20 t.

Similarly, the second data packet $P_2$ (indicated by a broken line in FIG. 2) is required to be output to the transmitting path 34 during a time period from time 23 t to time 45 t. At this time, a cycle $C_4$ starts at time 40 t, and therefore the data packet $P_2$ is output in cycle $C_4$. However, the transmitting path 34 is busy for transmitting data from the other device during cycle $C_4$. Thus, the packet $P_2$ cannot be transferred and thus is abandoned. Since there is no data packet to be transmitted in the previous cycle $C_3$, a vacant packet $V_2$ is generated in the packet generator 31 and it output to the transmitting path 34.

The third data packet $P_3$ is to be output to the transmitting path 34 during a time period from time 48 t to time 61 t. Accordingly, the data packet $P_3$ can be output in cycles $C_5$ and $C_6$ which start at time 50 t and 60 t, respectively. However, as shown in FIG. 2, since the transmitting path 34 is busy during cycle $C_5$, the data packet $P_3$ is output in the available cycle $C_6$.

The fourth data packet $P_4$ is to be output to the transmitting path 34 during a time period from time 64 t to time 77 t. During this time, an available cycle $C_7$ starts at time 70 t, and therefore the data packet $P_4$ is output in cycle $C_7$. In a cycle $C_8$, since there is no data packet to be transmitted, a vacant packet $V_3$ is generated and output to the transmitting path 34.

The fifth data packet $P_5$ is to be output to the transmitting path 34 during a time period from time 80 t to time 93 t. Accordingly, the data packet $P_5$ can be output in cycles $C_8$ and $C_9$ which start at times 80 t and 90 t, respectively. Since cycle $C_8$ is occupied by the vacant packet $V_3$, the data packet $P_5$ is output in cycle $C_9$.

In the conventional packet device 300, as described above, the packet generator 31 generates the data packets $P_i$ (i=1, 2, 3, . . . . ), or vacant packets $V_k$ (k=1, 2, 3,, . . . . ) in the case there is no data to be transmitted, for output to the packet transmitting circuit 32 at a time (10×j)t at which each cycle $C_j$ starts. Accordingly, the packet generator 31 is required to generate and transmit the packets in accordance with the transmission cycle $C_j$. The packet generator must generate and transmit the packets to the transmitting path 34, based on the clock time defined by the clock signal generated from the clock signal generator 33. For this reason, the packet generator 31 is required to constantly monitor the clock time and perform predetermined operations for each transmission cycle $C_j$, i.e., the packet generator 31 should perform a timing control on the order of μsec. This increases the load on the packet generator 31. For example, when the packet generator 31 is implemented using a microcomputer, it is necessary for the microcomputer to constantly monitor the clock time, thus reducing the time available for executing other tasks for operation processes.

SUMMARY OF THE INVENTION

A packet output device according to the present invention for formatting serial data into packets and for transmitting resulting data packets includes a data packet generator for generating each data packet and for generating time data corresponding to the data packet, the time data defining an output time of the data packet; and a packet transmitting circuit for receiving the data packet and the corresponding time data and transmitting the data packet based on the corresponding time data.

According to another aspect of the invention, a packet output device for formatting serial data into packets and for transmitting resulting data packets includes a clock signal generator for generating a clock signal defining clock time; a data packet generator for generating each data packet and for generating time data corresponding to the data packet, the time data defining an output time of the data packet based on the clock time; and a packet transmitting circuit for receiving the data packet and the corresponding time data and for transmitting the data packet based on the corresponding time data in accordance with the clock time.

In one embodiment of the invention, the time data generated by the data packet generator includes a transmission start time before which the corresponding data packet is prevented from being transmitted, and a transmission end time after which the corresponding data packet is prevented from being transmitted. The packet transmitting circuit compares the clock time with the transmission start time and the transmission end time of the time data, in a case where the clock time is before the transmission start time, a vacant packet for indicating absence of data to be transmitted is output, and in a case where the clock time is between the transmission start time and the transmission end time, the data packet is output.

In another embodiment of the invention, the time data generated by the data packet generator includes a transmission start time before which the corresponding data packet is prevented from being transmitted, and a transmission time width starting from the transmission start time during which the corresponding data packet can be transmitted. The packet transmitting circuit compares the clock time with the transmission start time and the transmission time width of the time data, in a case where the clock time is before the transmission start time, a vacant packet for indicating absence of data to be transmitted is output, and in a case where the clock time is between the transmission start time and a time which is obtained by adding the transmission time width to the transmission start time, the data packet is output.

In still another embodiment of the invention, the packet transmitting circuit includes a vacant packet generator for generating a vacant packet for indicating absence of data to be transmitted; a packet selector for receiving a data packet generated in the data packet generator and a vacant packet generated in the vacant packet generator, and selecting either one of the data packet or the vacant packet in accordance with the time data of the corresponding data packet and the clock time; and a transmitting circuit for transmitting a packet selected by the packet selecting means.

In yet another embodiment of the invention, the time data generated by the data packet generator includes a transmission start time before which the corresponding data packet is prevented from being transmitted, and a transmission end time after which the corresponding data packet is prevented from being transmitted. The packet selecting means compares the clock time with the transmission start time and the transmission end time of the time date, in a case where the clock time is before the transmission start time, a vacant packet for showing absence of data to be transmitted is output, and in a case where the clock time is between the transmission start time and the transmission end time ,the data packet is output to the transmitting circuit.

In another embodiment of the invention, the time data generated by the data packet generator includes a transmission start time before which the corresponding data packet is prevented from being transmitted, and a transmission time width starting from the transmission start time during which the corresponding data packet can be transmitted. The packet transmitting circuit compares the clock time with the transmission start time and the transmission time width of the time data, in a case where the clock time is before the transmission start time, a vacant packet for indicating absence of data to be transmitted is output, and in a case where the clock time is between the transmission start time and a time which is obtained by adding the transmission time width to the transmission start time, the data packet is output to the transmitting circuit.

In still another embodiment of the invention, the packet transmitting circuit includes a packet storage circuit for temporarily storing the data packet and the corresponding time data output from the data packet generator; a vacant packet generator for generating a vacant packet for showing absence of data to be transmitted; a packet selector for receiving a data packet stored in the packet storage circuit and a vacant packet generated in the vacant packet generator, and selecting either one of the data packet and the vacant packet in accordance with the time data of the data packet stored in the packet storage circuit and the clock time; and a transmitting circuit for transmitting a packet selected by the packet selector.

In yet another embodiment of the invention, the time data generated by the data packet generator includes a transmission start time before which the corresponding data packet is prevented from being transmitted, and a transmission end time after which the corresponding data packet is prevented from being transmitted; and the packet selecting means compares the clock time with the transmission start time and the transmission end time of the corresponding time data of the data packet stored in the storage means. In a case where the clock time is before the transmission start time, the vacant packet is output. In a case where the clock time is between the transmission start time and the transmission end time, the data packet is output to the transmitting circuit and further the data packet and the corresponding time data are deleted from the storage circuit. In a case where the clock time is past the transmission end time, the data packet and the corresponding time data are deleted from the storage means and the vacant packet is output.

In another embodiment of the invention, the time data generated by the data packet generator includes a transmission start time before which the corresponding data packet is not permitted to be transmitted, and a transmission time width starting from the transmission start time during which the corresponding data packet can be transmitted; and the packet transmitting circuit compares the clock time with the transmission start time and the transmission time width of the time data of the data packet stored in the storage means. In a case where the clock time is before the transmission start time, the vacant packet is output. In a case where the clock time is between the transmission start time and a time which is obtained by adding the transmission time width to the transmission start time, the data packet is output to the transmitting circuit, and further the data packet and the corresponding time data are deleted from the storage means. In a case where the clock time is past a time which is obtained by adding the transmission time width to the transmission start time, the data packet and the corresponding time data are deleted from the storage circuit and the vacant packet is output.

According to another aspect of the invention, a packet output method for formatting serial data into packets and transmitting resulting data packets includes the steps of: generating each data packet and time data corresponding to the data packet for defining output time of the data packet; and receiving the data packet and the corresponding time data and transmitting the data packet based on the time data.

According to another aspect of the invention, a packet output method for formatting serial data into packets and transmitting resulting data packets includes the steps of: generating a clock signal defining clock time; generating a data packet and time data corresponding to the data packet for defining an output time of the data packet based on the clock time; and transmitting the data packet based on the time data and the clock time.

In one embodiment of the invention, the time data includes a transmission start time before which the corresponding data packet is not permitted to be transmitted, and a transmission end time after which the corresponding data packet is not permitted to be transmitted. The packet transmitting step includes the steps of: comparing the clock time with the transmission start time and the transmission end time of the time data; outputting a vacant packet for showing absence of data to be transmitted in a case where the clock time is before the transmission start time; and outputting the data packet in a case where the clock time is past the transmission start time and before the transmission end time.

In another embodiment of the invention, the time data includes a transmission start time before which the corresponding data packet is prevented from being transmitted, and a transmission time width starting from the transmission start time during which the corresponding data packet can be transmitted. The packet transmitting step includes the steps of: comparing the clock time with the transmission start time and the transmission time width of the time data; outputting a vacant packet for indicating absence of data to be transmitted in a case where the clock time is before the transmission start time; and outputting the data packet in a case where the clock time is past the transmission start time and before a time obtained by adding the transmission time width to the transmission start time.

In still another embodiment of the invention, the packet transmitting step includes the steps of: generating a vacant packet for indicating absence of data to be transmitted; selecting either one of the data packet and the vacant packet in accordance with the time data of the data packet and the clock time; and transmitting the selected packet.

In yet another embodiment of the invention, the time data includes a transmission start time before which the corresponding data packet is prevented from being transmitted, and a transmission end time after which the corresponding data packet is not permitted to be transmitted. The step of selecting includes the steps of: comparing the clock time with the transmission start time and the transmission end time of the time data; outputting a vacant packet for indicating absence of data to be transmitted in a case where the clock time is before the transmission start time; and outputting the data packet in a case where the clock time is past the transmission start time and before the transmission end time.

In another embodiment of the invention, the time data includes a transmission start time before which the corresponding data packet is not permitted to be transmitted, and a transmission time width starting from the transmission start time during which the corresponding data packet can be transmitted. The step of selecting includes the steps of: comparing the clock time with the transmission start time and the transmission time width of the time data; outputting a vacant packet for showing absence of data to be transmitted in a case where the clock time is before the transmission start time; and outputting the data packet in a case where the clock time is between the transmission start time and a time which is obtained by adding the transmission time width to the transmission start time.

In still another embodiment of the invention, the packet transmitting step includes the steps of: temporarily holding the data packet generated in the data packet generating step and the corresponding time data; generating a vacant packet for indicating absence of data to be transmitted; selecting either one of the stored data packet and the vacant packet in accordance with the time data of the stored data packet and the clock time; and transmitting the selected packet.

In yet another embodiment of the invention, the time data generated includes a transmission start time before which the corresponding data packet is prevented from being transmitted, and a transmission end time after which the corresponding data packet is prevented from being transmitted. The packet selecting step includes the steps of: comparing the clock time with the transmission start time and the transmission end time of the time data of the stored data packet; outputting the vacant packet in a case where the clock time is before the transmission start time; outputting the data packet to the transmitting circuit, and further deleting the data packet and the corresponding time data from the storage circuit in a case where the clock time is past the transmission start time and before the transmission end time; and deleting the data packet and the corresponding time data which have been held in the holding step in a case where the clock time is past the transmission end time.

In another embodiment of the invention, the time data includes a transmission start time before which the corresponding data packet is not permitted to be transmitted, and a transmission time width starting from the transmission start time during which the corresponding data packet can be transmitted. The packet selecting step comprising the steps of: comparing the clock time with the transmission start time and the transmission time width of the time data of the stored data packet; outputting the vacant packet in a case where the clock time is before the transmission start time; outputting the data packet, and deleting the data packet and the corresponding time data which have been held in the holding step in a case where the clock time is between the transmission start time and a time which is obtained by adding the transmission time width to the transmission start time; and deleting the data packet and the corresponding time data which have been held in the holding step in a case where the clock time is past a time which is obtained by adding the transmission time width to the transmission start time.

Thus, the invention described herein makes possible the advantages of (1) providing a packet output device and a packet output method allowing a data packet generator to have a simple structure by making it unnecessary for the data packet generator to monitor the conditions of the transmitting path and the clock time, and (2) providing a packet output device and a packet output method for transmitting packets in accordance with the corresponding time data which is generated in the data packet generator and is added to the respective packets.

These and other advantages of the present invention will become apparent to those skilled in the art upon reading and understanding the following detailed description with reference to the accompanying figures.

BRIEF DESCRIPTION OF THE DRAWINGS

FIG. 5 is a table of exemplary transmission cycles in which packets are output to the transmitting path including a start time for each transmission cycle.

FIG. 6 is a table of an example of the time data (transmission start time and transmission end time) and the transmission cycles in which the corresponding data packets can be transmitted.

FIG. 7 is a table of another example of the time data (transmission start time and transmission time width) and the transmission cycles in which the corresponding data packets can be transmitted.

DESCRIPTION OF THE PREFERRED EMBODIMENTS

EXAMPLE 1

Figure 1:
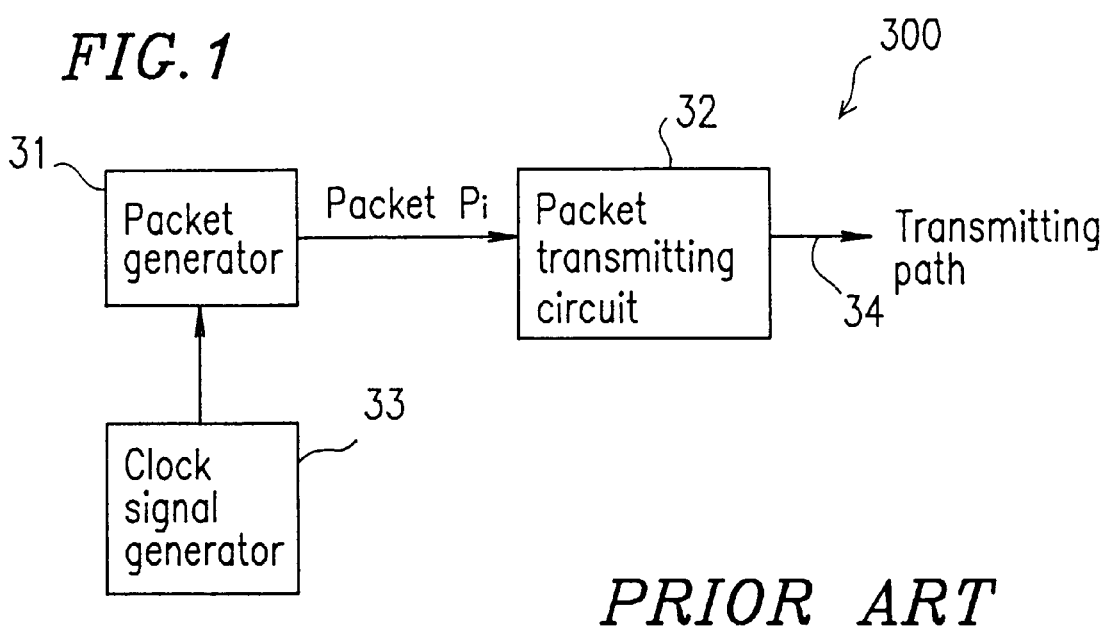
FIG. 1 is a block diagram illustrating an exemplary structure of a conventional packet output device.
Figure 2:
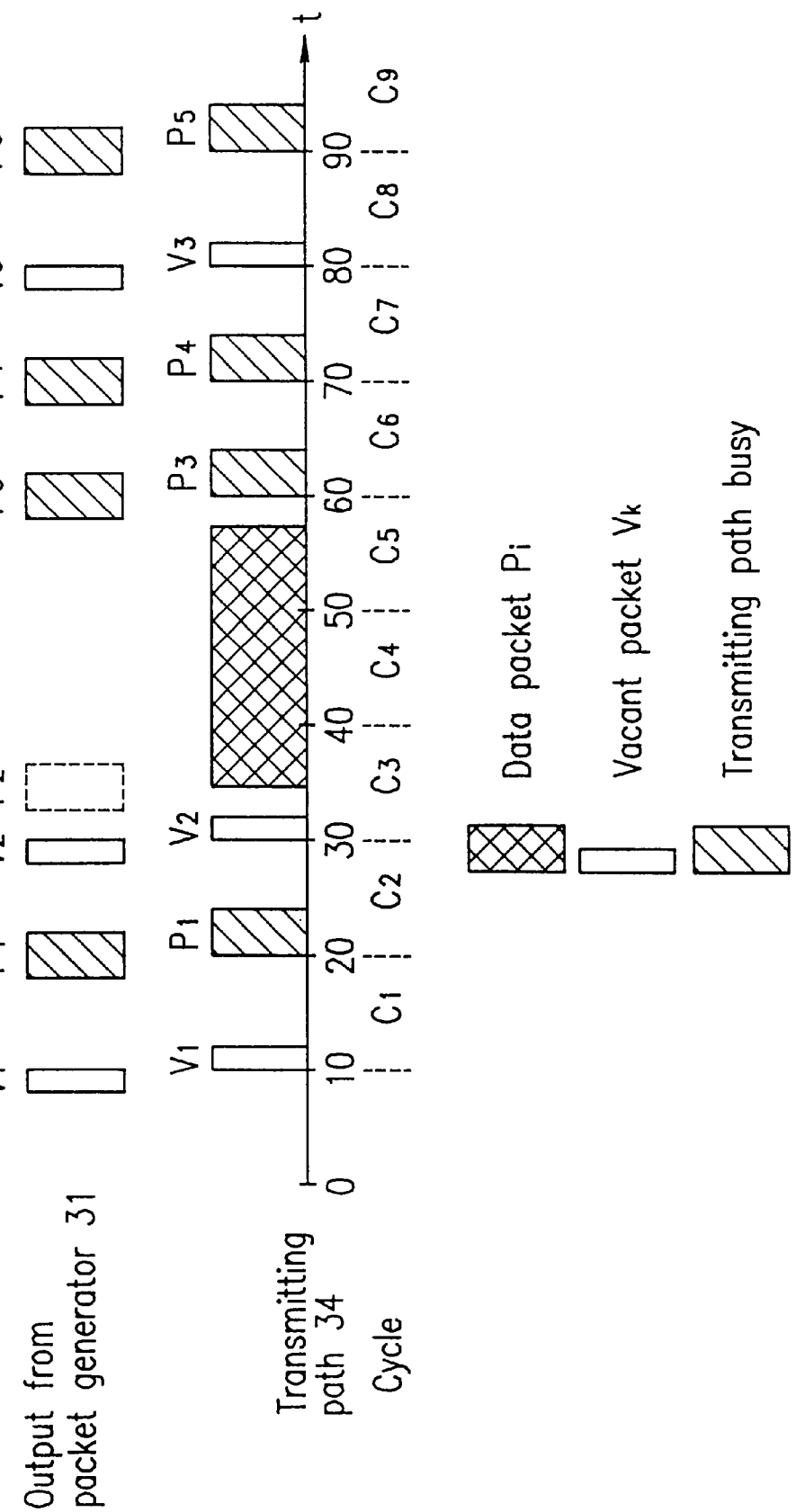
FIG. 2 is a timing chart illustrating the operation of the conventional packet output device.
Figure 3:
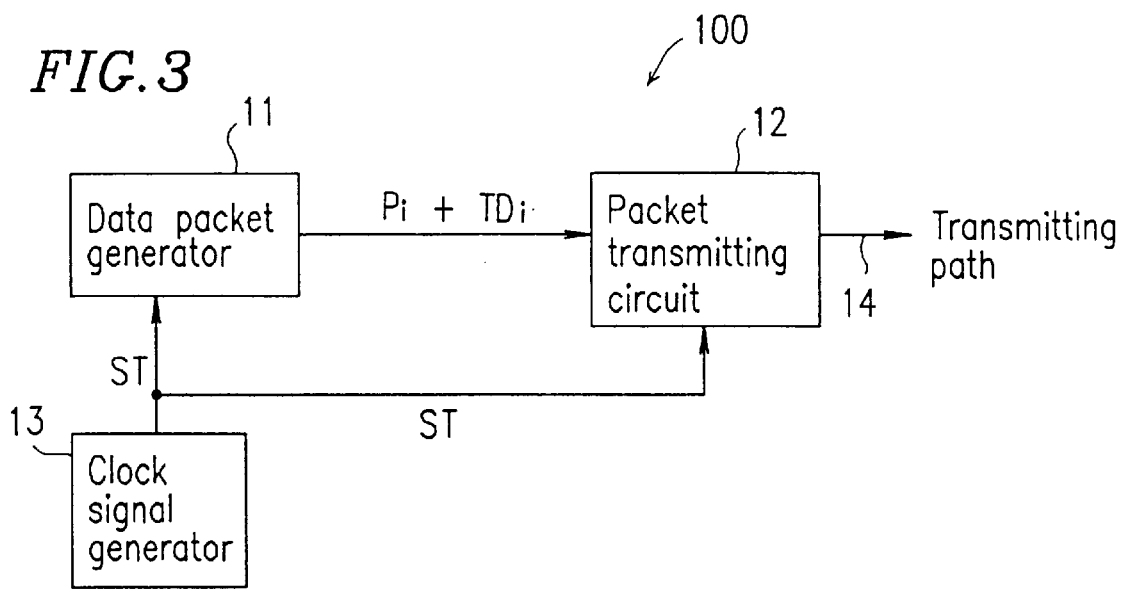
FIG. 3 is a block diagram illustrating a basic structure of a packet output device in Example 1 according to the present invention.

A structure and an operation of a packet output device 100 according to Example 1 of the present invention will be described with reference to FIGS. 3 and 4. FIG. 3 schematically shows the basic structure of the packet output device 100 of Example 1. As shown in FIG. 3, the packet output device 100 includes a data packet generator 11, a packet transmitting circuit 12 and a clock signal generator 13. In the same manner as in the conventional clock signal generator 33, the clock signal generator 13 outputs, for example, a clock signal in a predetermined cycle. The clock time ST of the system of the packet output device 100 is defined by the clock signal. The clock signal (clock time ST) is supplied to both the data packet generator 11 and the packet transmitting circuit 12.

The data packet generator 11 generates data packets $P_i$ (i=1, 2, 3, ....) and time data $TD_i$ for specifying the time at which the corresponding data packet $P_i$ is output. The time data $TD_i$ is generated based on the clock time ST which is defined by the clock signal generated by the clock signal generator 13. In addition, the data packet generator 11 outputs the generated data packet $P_i$ and time data $TD_i$ to the packet transmitting circuit 12.

The packet transmitting circuit 12 compares the time data $TD_i$ with the clock time ST. When the clock time ST is within the time specified by the time data $TD_i$, the data packet $P_i$ corresponding to the time data $TD_i$ is output to a transmitting path 14 in accordance with a cycle $C_j$. When the clock time ST is not within the time specified by the time data $TD_i$, a vacant packet $V_i$ is generated and output to the transmitting path 14.

The time data $TD_i$ includes; for example, a transmission start time $t_s$ before which transmission of the corresponding packet is prevented from starting and a transmission end time $t_E$ after which transmission of a packet is prevented from being performed. The packet transmitting circuit 12 compares the transmission start time $t_s$ of the time data $TD_i$ with the clock time ST for each transmission cycle $C_j$. In the case where the clock time ST is later than the transmission start time $t_s$, the data packet $P_i$ corresponding to the time data $TD_i$ is output to the transmitting path 14. In the case where the clock time ST goes by the transmission end time $t_E$ without the data packet $P_i$ being transmitted, such as in the case where the transmitting path is busy, the transmission of the data packet $P_i$ is cancelled. When there is no data packet $P_i$ to be transmitted in a transmission cycle $C_j$, the vacant packet $V_k$ is generated and output to the transmitting path 14.

Figure 4:
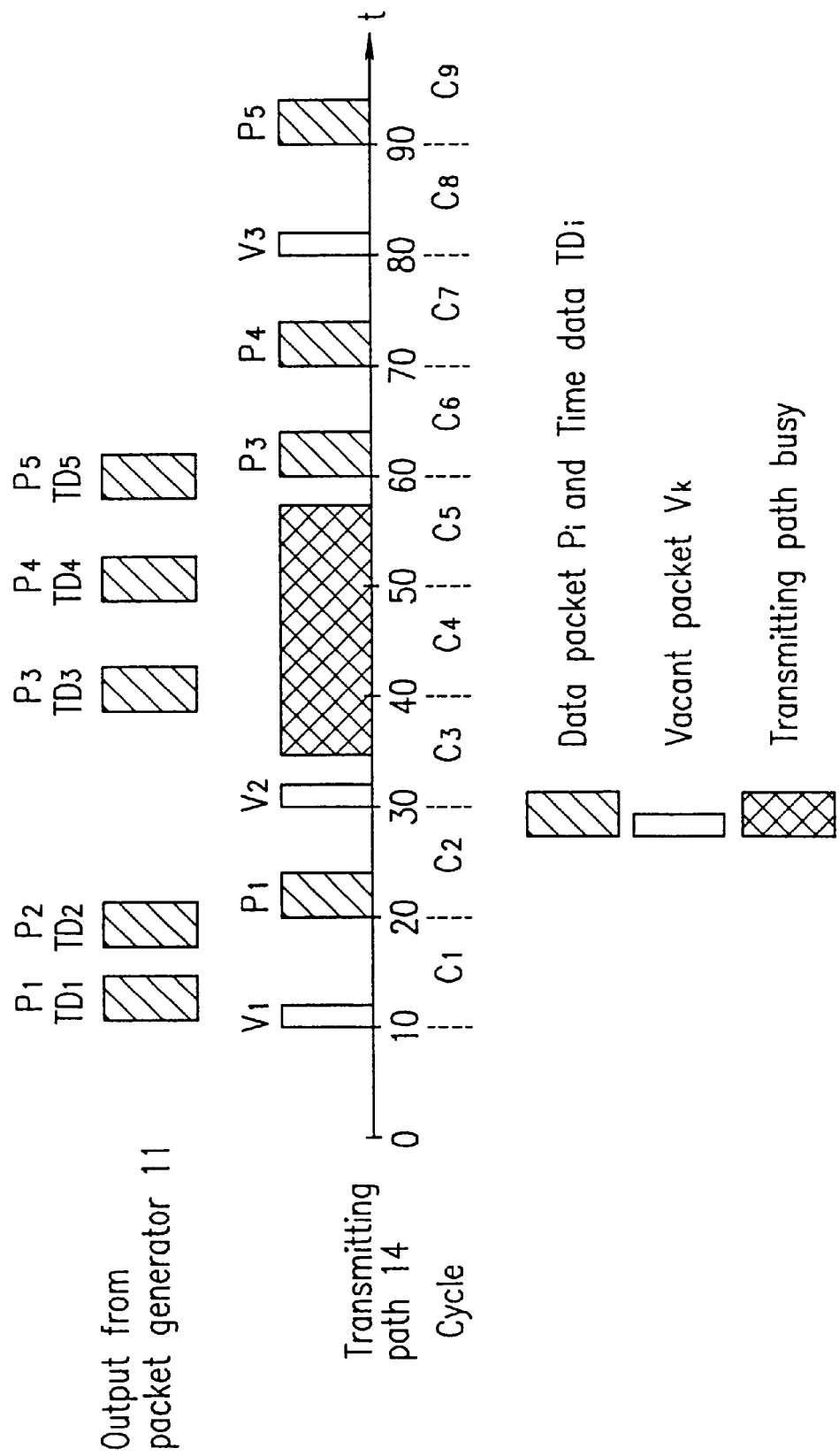
FIG. 4 is a timing chart illustrating the operations of a packet output device according to the present invention.

FIG. 4 shows an exemplary arrangement of the packets output from the packet output device 100 to the transmitting path 14. FIG. 5 shows an example of cycles $C_j$ (j=1, 2, 3, ...) in which the packets $P_i$ (i=1, 2, 3, ....) are output to the transmitting path 14 and includes a start time for each cycle $C_j$. In this case, a time period of one cycle is 10 t as in the case of the conventional packet output device 300.

The data packet generator 11 generates the data packet $P_i$ and the corresponding time data $TD_i$ and outputs them to the packet transmitting circuit 12. As shown in FIG. 4, the time at which the data packet $P_i$ is generated is not limited to a fixed cycle. Instead a data packet $P_i$ may be generated at random time interval. FIG. 6 shows an example of the time data $TD_i$ (transmission start time $t_s$ and transmission end time $t_E$) and cycles $C_j$ in which the corresponding data packet can be transmitted.

Next, the operations of the packet output circuit 100 will be more specifically described below. The data packet generator 11 generates the data packet $P_i$ (the length of the data packet generation cycle may be arbitrary) and outputs the corresponding time data $TD_i$ in addition to the generated data packet $P_i$. In this example, the transmission start time $t_s$ and the transmission end time $t_E$ are specified for each data packet $P_i$.

As shown in FIGS. 3 and 4, the data packet generator 11 generates a first data packet $P_1$ and the time data $TD_1$ and outputs them to the packet transmitting circuit 12. The packet transmitting circuit 12 compares the time data $TD_1$ supplied from the data packet generator 11 with the clock time ST. Then, the packet transmitting circuit 12 outputs the data packet $P_1$ in a cycle $C_2$ which is a first cycle starting after the time $t_s$ (=16 t) and ending before $t_E$ (=29 t) among the transmission cycles $C_j$. Next, the packet transmitting circuit 12 attempts to output the data packet $P_2$ in a cycle $C_4$ which is the first cycle starting after $t_s$ )=32 t) and ending before $t_E$ (=45 t) among the cycles $C_j$, in accordance with the corresponding time data $TD_2$. However, as shown in FIG. 4, since the transmitting path 14 is busy in cycle $C_4$, the data packet $P_2$ is abandoned and not output to the transmitting path 14.

Similarly, the packet transmitting circuit 12 attempts to output the data packet $P_3$ during a cycle $C_5$ which starts after 48 t and ends before 61 t. However, since the transmitting path 14 is busy in a cycle $C_5$ as well as in cycle $C_4$, the data packet $P_3$ is output in a next available cycle $C_6$ which starts before the time period specified by time data $TD_3$ ends. Similarly, the packet transmitting circuit 12 outputs the data packet $P_4$ in a cycle first starting after the time 64 t and ending before the time 77 t, cycle $C_7$, and outputs the data packet $P_5$ in a cycle first starting after the time 80 t and ending before the time 93 t, cycle $C_8$. In cycles $C_1$, $C_3$ and $C_9$ where no data packet $P_i$ is supplied to the packet transmitting circuit 12, and the transmitting path 14 is available, vacant packets $V_1$, $V_2$ and $V_3$ are generated by the packet transmitting circuit 12 and are output to the transmitting path 14 (shown in FIG. 4).

As described above, the data packet generator 11 outputs the time data $TD_i$ in addition to the data packet $P_i$ so that it is possible to output the data packet $P_i$ to the packet transmitting circuit 12 regardless of the transmission cycle $C_j$ for outputting the generated packet $P_i$ to the transmitting path 14. Thus, the load on the data packet generator 11 can be reduced.

In the packet output device 100 described above, the data packet generator 11 generates the transmission start time $t_s$ and the transmission end time $t_E$ as shown in FIG. 6 as the time data $TD_i$ to output to the packet transmitting circuit 12. The time data $TD_i$ is not limited to this example. Alternatively, for example, as shown in FIG. 7, the time data $TD_i$ may include transmission start time $t_s$ and a transmission time width $t_w$ (=13 t) which represents the time period during which the transmission is allowed. In this case, the same effects can be obtained. For example, the packet transmitting circuit 12 receives the transmission start time $t_s$ and the transmission time width $t_w$ as the time data $TD_i$ of the packet $P_i$. The packet transmitting circuit 12 outputs the data packet $P_i$ to the transmitting path 14 at a time after the transmission start time $t_s$ of 16 t and before the time of 29 t which is a time width $T_w$ of 13 t later than the transmission start time. Other packets $P_i$ are output in the similar manner.

Thus, the data packet generator 11 outputs the time data $TD_i$ in addition to the data packet $P_i$ to the packet transmitting circuit 12, so that it is unnecessary for the data packet generator 1 to constantly monitor the clock time. As a result, the data packet generator 11 can be simplified and the load thereon can be reduced.

In this example, the data packet generator 11 generates the transmission start time $t_s$ as one of the time data $TD_i$. However, the cycle $C_j$ in which the data packet $P_i$ can be output may be determined by setting the transmission start time $t_s$ as the time at which the data packet $P_i$ is output from the data packet generator 11 (i.e., the permitted time period for outputting the data packet is set to be a predetermined time interval following the time at which the data packet is generated), and by identifying the transmission end time $t_E$ or transmission time width $t_w$.

EXAMPLE 2

Figure 8:
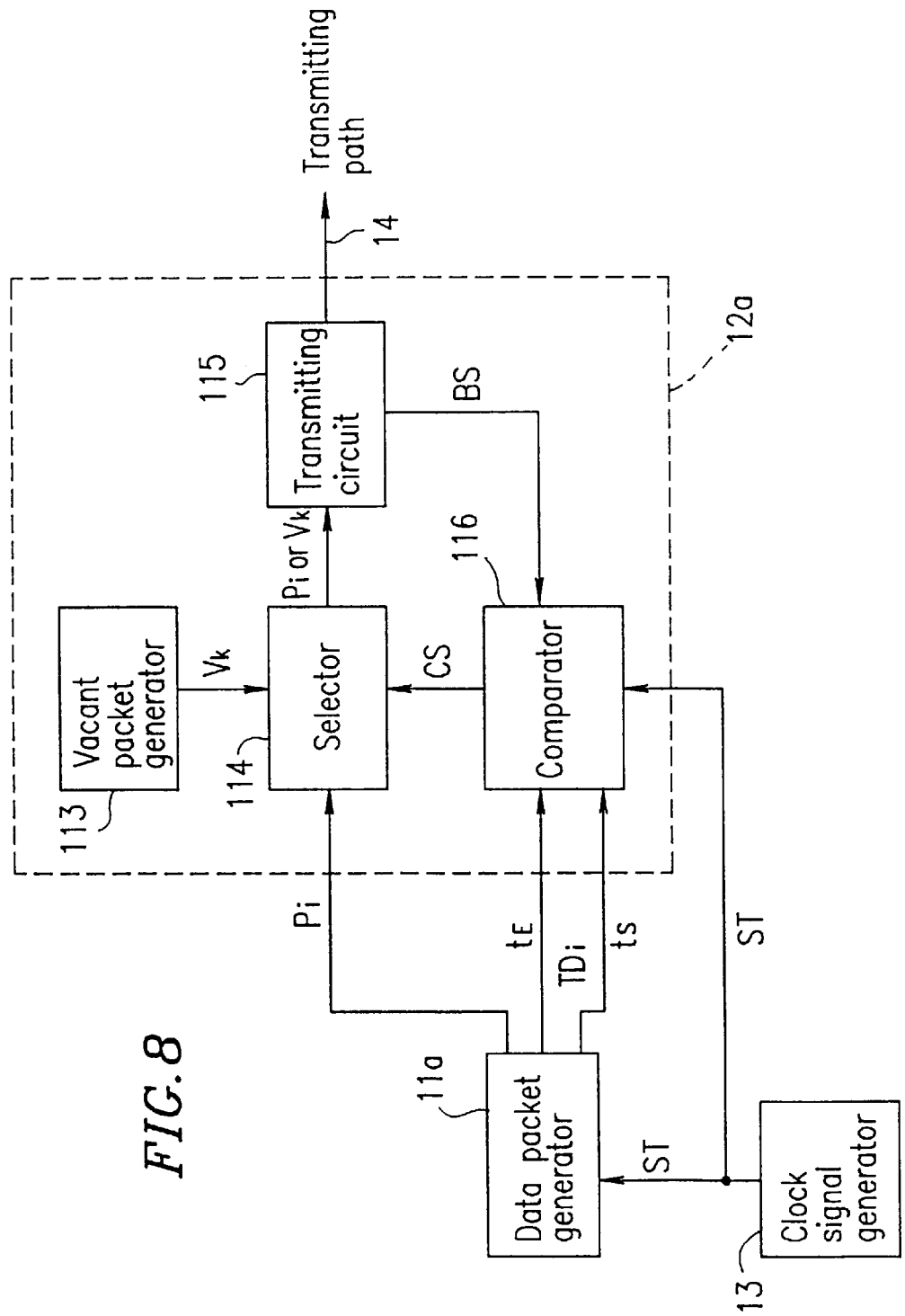
FIG. 8 is a block diagram illustrating a basic structure of a packet output device in Example 2 according to the present invention.

A packet output device 110 according to Example 2 of the present invention will be described with reference to FIG. 8. FIG. 8 shows the basic structure of the packet output device 110 of Example 2. As shown in FIG. 8, the packet output device 110 includes a data packet generator 11a, a packet transmitting circuit 12a and a clock signal generator 13. The packet transmitting circuit 12a includes a vacant packet generator 113, a selector 114, a transmitting circuit 115 and a comparator 116. The clock signal generator 13 is the same as the conventional clock signal generator 33, as in the case of the packet output device 100 according to Example 1. The clock signal generator 13 outputs, for example, a clock signal for defining a clock time ST for the system of the packet output device 110. The clock time ST is supplied to the data packet generator 11a and the comparator 116 of the packet transmitting circuit 12a.

As shown in FIG. 8, the data packet generator 11a generates data packets $P_i$ (i=1, 2, 3, . . . . ) and the corresponding time data $TD_i$ (transmission start time $t_s$ and transmission end time $t_E$) for identifying the time at which the data packet $P_i$ will be output. As in Example 1, the time at which the data packet $P_i$ is output depends on the clock time ST. The data packet $P_i$ is supplied to the selector 114, and the transmission start time $t_s$ data and the transmission end time $t_E$ data are supplied to the comparator 116.

In the packet transmitting circuit 12a, the vacant packet generator 113 generates vacant packets $V_k$ (k=1, 2, 3, . . . . ) each of which indicates the absence of data to be output to the selector 114. The selector 114 selectively outputs either one of the data packet $P_i$ and the vacant packet $V_k$ to the transmitting circuit 115, based on a control signal CS (described in detail later) supplied from the comparator 116. The transmitting circuit 115 outputs the data packet $P_i$ or the vacant packet $V_k$ input from the selector 114, to the transmitting path 14. In this example, the timing chart showing the packet arrangement on the transmitting path 14 is the same as that in FIG. 4.

The transmitting circuit 115 informs the comparator 116 of whether or not the packet can be output to the transmitting path 14 (i.e., whether of not the transmitting path 14 is busy) for each transmission cycle $C_j$ by a signal BS. Signal BS may be, for example, a signal which is output only when the transmitting path 14 is available.

The comparator 116 generates a control signal CS based on the time data $TD_i$ (the transmission start time $t_s$ and the transmission end time $t_E$) input from the data packet generator 11a and the clock time ST defined by the clock signal input from the clock signal generator 13. The comparator 116 compares the transmission start time $t_s$ and the transmission end time $t_E$ with the clock time ST for each cycle $C_j$. The control signal CS is supplied to the selector 114.

In the case where the clock time ST is later than the transmission start time $t_s$ and earlier than the transmission end time $t_E$, the comparator 116 determines that the data packet $P_i$ should be selected. In the case where the result of the comparison is other than the above, the comparator 116 determines that the vacant packet V should be selected. When the signal BS supplied from the transmitting circuit 115 indicates that the transmitting path 14 is available (or not busy), the comparator 116 outputs a control signal CS to the selector 114 so that the data packet $P_i$ or vacant packet $V_k$ are selected in accordance with the decision, and the selected packet is output. When the signal BS supplied from the transmitting circuit 115 indicates that the transmitting path 14 is busy, the comparator 116 outputs the control signal CS to the selector 114 so as not to output either one of the packet from the selector 114.

More simply, for example, the signal BS may be supplied from the transmitting circuit 115 to the comparator 116 only when the transmitting path 14 is available, and the comparator 116 outputs control signal CS only when the comparator 116 receives the signal BS so as to specify either one of the data packet $P_i$ or the vacant packet $V_k$ to be output. In this case, the data packet $P_i$ or the vacant packet $V_k$ is output to the transmitting circuit 115 only when the selector 114 receives control signal CS.

As described above, the data packet generator 11a outputs the time data $TD_i$ (transmission start time $t_s$, the transmission end time $t_E$) in addition to the data packet $P_i$ to the packet transmitting circuit 12a, so that it is unnecessary for the data packet generator 11a to constantly monitor the clock time. As a result, the data packet generator 11a can be simplified and the load thereon can be reduced.

In this example, the data packet generator 11a generates the transmission start time $t_s$ as one of the time data $TD_i$. However, the cycle $C_j$ in which the data packet $P_i$ can be output may be determined by setting the transmission start time $t_s$ as the time at which the data packet $P_i$ is output from the data packet generator 11a (i.e., the permitted time period for outputting the data packet is set as a predetermined time interval after the time at which the data packet is generated), and by identifying the transmission end time $t_E$ or transmission time width $t_w$.

EXAMPLE 3

Figure 9:
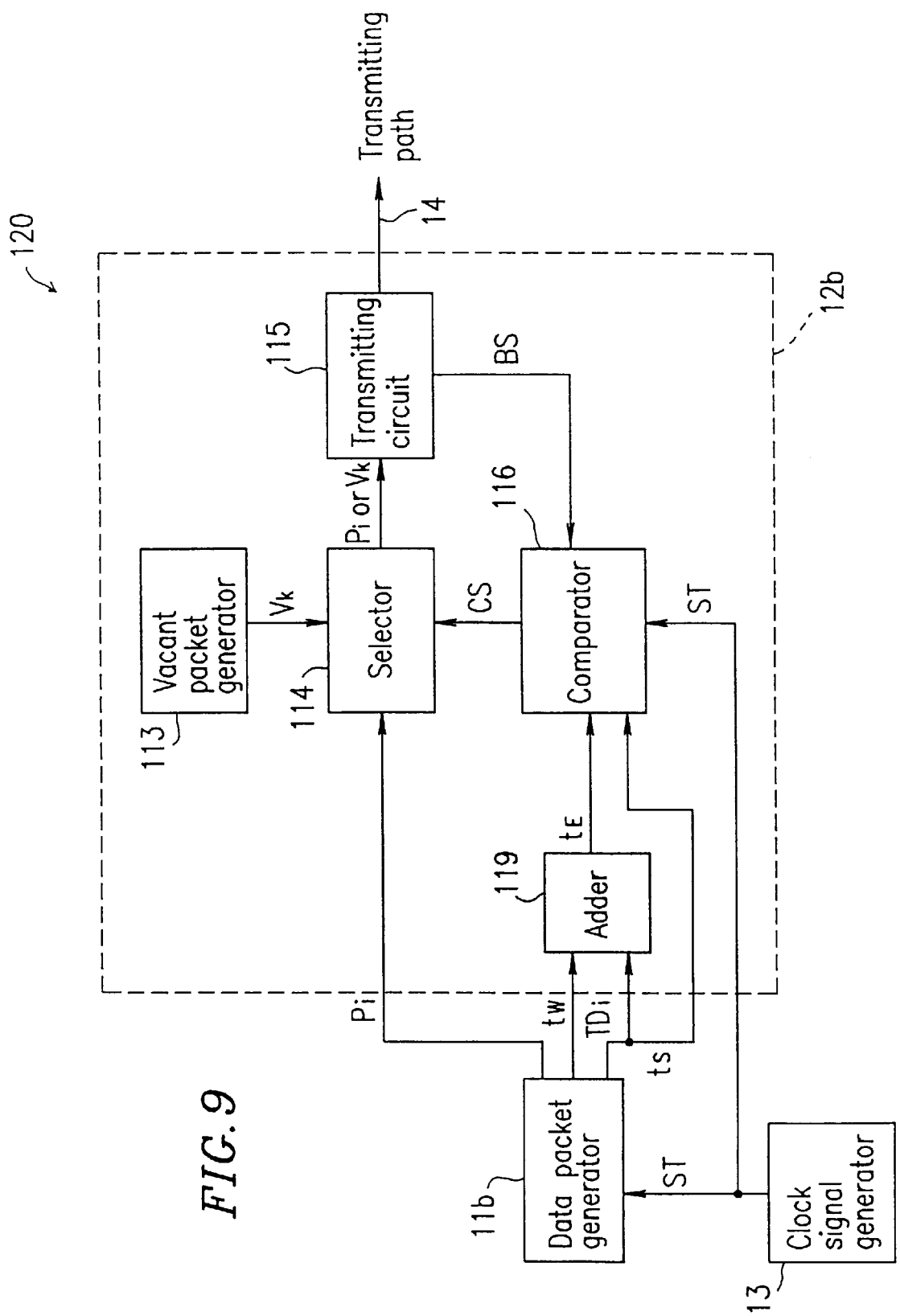
FIG. 9 is a block diagram illustrating a basic structure of a packet output device in Example 3 according to the present invention.

A packet output device 120 according to Example 3 of the present invention will be described with reference to FIG. 9. FIG. 9 is a block diagram showing the basic structure of the packet output device 120 of Example 3. The same components bear the same reference numerals as in Example 2. As shown in FIG. 9, the packet output device 120 includes a data packet generator 11b, a packet transmitting circuit 12b and a clock signal generator 13. The packet transmitting circuit 12b includes a vacant packet generator 113, a selector 114, a transmitting circuit 115, a comparator 116 and an adder 119. The clock signal generator 13 is the same as the conventional clock signal generator 33, as in the case of the packet output devices according to Examples 1 and 2. The clock signal generator 13 outputs, for example, a clock signal for defining a clock time ST for the system of the packet output device 120. The clock time ST is supplied to the data packet generator 11b and the comparator 116 of the packet transmitting circuit 12b.

As shown in FIG. 9, the data packet generator 11b generates a data packet $P_i$ (i=1, 2, 3, . . . . ) and corresponding time data $TD_i$ (transmission start time $t_s$ and transmission time width $t_w$) for specifying the time at which the data packet $P_i$ will be output, based on the clock time ST. The data packet $P_i$ is supplied to the selector 114 of the packet transmitting circuit 12b, and the transmission start time $t_s$ is supplied to the comparator 116 and the adder 119. The transmission time width $t_w$ is also supplied to the adder 119.

In the packet transmitting circuit 12b, the vacant packet generator 113 generates a vacant packet $V_k$ (k=1, 2, 3, . . . . ), each of which indicates the absence of data to output to the selector 114. The adder 119 generates the transmission end time $t_E$ by adding the transmission start time $t_s$ and the transmission time width $t_w$ supplied from the data packet generator 11b. The adder 119 outputs the generated transmission end time $t_E$ to the comparator 116.

The selector 114 selectively outputs either one of the data packet $P_i$ or the vacant packet $V_k$ to the transmitting circuit 115, based on a control signal CS (described in detail later) supplied from the comparator 116. The transmitting circuit 115 outputs the data packet $P_i$ or the vacant packet $V_k$ input from the selector 114, to the transmitting path 14. In this example, the timing chart showing the packet arrangement on the transmitting path 14 is the same as that in FIG. 4.

The transmitting circuit 115 informs the comparator 116 whether or not the packet can be output to the transmitting path 14 (i.e., whether or not the transmitting path 14 is busy) for each transmission cycle $C_j$ (by a signal BS). Signal BS can be, for example, a signal which is output only when the transmitting path 14 is not busy.

The comparator 116 generates the control signal CS based on the signal BS supplied from the transmitting circuit 115, the transmission start time $t_s$ input from the data packet generator 11b, the transmission end time $t_E$ input from adder 119 and the clock time ST input from the clock signal generator 13.

The comparator 116 compares the transmission start time $t_s$ and the transmission end time $t_E$ with the clock time ST for each cycle $C_j$. In the case where the clock time ST is past the transmission start time $t_s$, and the clock time ST is not past the transmission end time $t_E$, the comparator 116 determines that the data packet $P_i$ should be selected. In the case where the result of the comparison is other than the above, the comparator 116 determines that the vacant packet $V_k$ should be selected. In the case where the signal BS supplied from the transmitting circuit 115 indicates that the transmitting path 14 is not busy, the comparator 116 outputs the control signal CS to the selector 114 so that the determined packet, the data packet $P_i$ or the vacant packet $V_k$, is selected and output. In the case where the signal BS supplied from the transmitting circuit 115 indicates that the transmitting path 14 is busy, the comparator 116 outputs the control signal CS to the selector 114 so that neither of the packets is output.

More simply, for example, only when the transmitting path 14 is not busy, is the signal BS input from the transmitting circuit 115 to the comparator 116, and only when the comparator 116 receives the signal BS, can the comparator 116 output the control signal CS for specifying either one of the data packet $P_i$ or the vacant packet $V_k$. In this case, only when the selector 114 receives the control signal CS, is the data packet $P_i$ or the vacant packet $V_k$ output to the transmitting circuit 115 in accordance with the control signal CS.

As described above, the data packet generator 11b outputs the time data $TD_i$ (the transmission start time $t_s$ and the transmission time width $t_w$) in addition to the data packet $P_i$ to the packet transmitting circuit 12b, so that it is unnecessary for the data packet generator 11b to constantly monitor the clock time. As a result, the structure of the data packet generator 11b can be simplified, thus reducing the burden thereon.

In this example, the data packet generator 11b generates the transmission start time $t_s$ as one of the time data $TD_i$. However, by setting the time at which the data packet generator 11b outputs the data packet $P_i$ as the transmission start time $t_s$ (i.e., setting a predetermined time interval after the time at which the data packet is generated as a period of time during which a data packet can be output), and by specifying the transmission time width $t_w$, the cycle $C_j$ in which the data packet $P_i$ can be output can be determined. Furthermore, in the case where the transmission time width $t_w$ is a fixed value, it is unnecessary to calculate the transmission end time $t_E$ for each cycle, once a value of the transmission time width $t_w$ is set in the adder 119.

EXAMPLE 4

A packet output device 130 according to Example 4 of the present invention will be described with reference to FIG.

Figure 10:
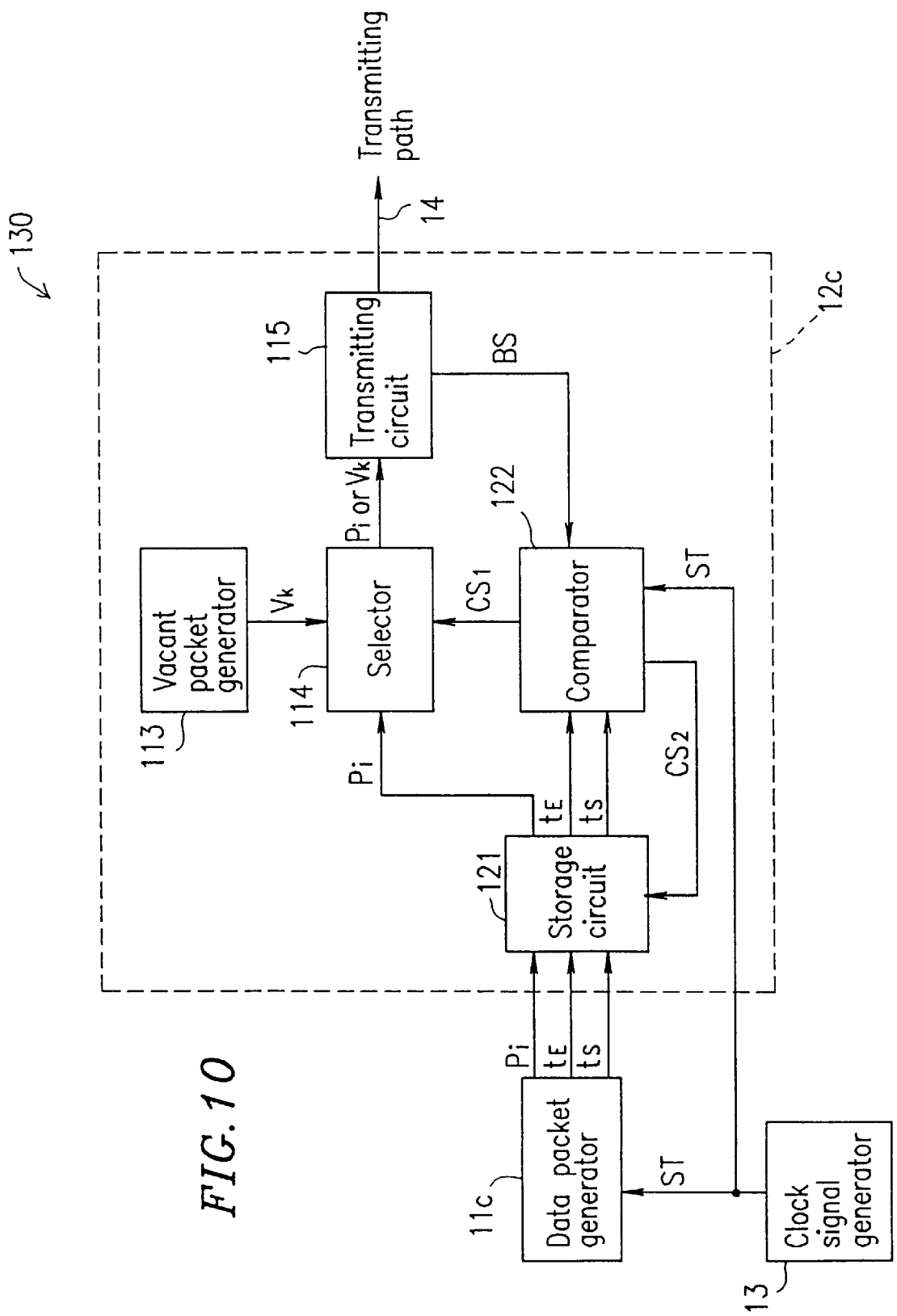
FIG. 10 is a block diagram illustrating a basic structure of a packet output device in Example 4 according to the present invention.

10. FIG. 10 is a block diagram showing the basic structure of the packet output device 130 of Example 4. The same components as in Example 2 bear the same reference numerals. As shown in FIG. 10, the packet output device 130 includes a data packet generator 11c, a packet transmitting circuit 12c and a clock signal generator 13. The packet transmitting circuit 12c includes a vacant packet generator 113, a selector 114, a transmitting circuit 115, a storage circuit 121 and a comparator 122. The clock signal generator 13 is the same as the conventional clock signal generator 33, as in the case of the packet output devices according to Examples 1 and 2. The clock signal generator 13 outputs, for example, a clock signal for defining a clock time ST for the system of the packet output device 130. The clock time ST is supplied to the data packet generator 11c and the comparator 122 of the packet transmitting circuit 12c.

As shown in FIG. 10, the data packet generator 11c generates a data packet $P_i$ (i=1, 2, 3, . . . ) and time data $TD_i$ (transmission start time $t_S$ and transmission end time $t_E$) for specifying a time at which the data packet $P_i$ will be output based on the clock time ST. The data packet $P_i$, the transmission start time $t_S$ and the transmission end time $t_E$ are supplied to the storage circuit 121 of the packet transmitting circuit 12c. The storage circuit 121 stores the data packet $P_i$, the transmission start time $t_S$ and the transmission end time $t_E$ input thereto.

The comparator 122 retrieves the transmission start time $t_S$ and the transmission end time $t_E$ of the oldest data packet $P_i$ stored in the storage circuit 121, and determines which to output, the data packet $P_i$ or a vacant packet $V_k$ (k=1, 2, 3, . . . ), by comparing the transmission start time $t_S$ and the transmission end time $t_E$ with the clock time ST input from the clock signal generator 13. Based on this determination, the comparator 122 outputs a control signal $CS_1$ to control the selector 114 so that the selector 114 outputs the determined packet, the data packet $P_i$ or the vacant packet $V_k$, to the transmission circuit 115.

Furthermore, when the comparator 122 determines that the data packet $P_i$ should be output, the comparator 122 simultaneously outputs a control signal $CS_2$ to the storage circuit 121 so that the storage circuit 121 outputs the corresponding data packet $P_i$ to the selector 114. Furthermore, the vacant packet generator 113 generates a vacant packet $V_k$ indicating the absence of data to output to the selector 114.

The selector 114 outputs either one of the data packet $P_i$ or the vacant packet $V_k$ to the transmitting circuit 115, in accordance with the determination of the comparator 122, based on control signal $CS_1$ supplied from the comparator 122. The transmitting circuit 115 outputs the data packet $P_i$ or the vacant packet $V_k$ input from the selector 114 to the transmitting path 14. Moreover, the transmitting circuit 115 informs the comparator 122 whether or not the packet can be output to the transmitting path 14 (i.e., whether or not the transmitting path 14 is busy) for each cycle $C_j$ (by a signal BS). Signal BS can be, for example, a signal which is output only when the transmitting path 14 is not busy.

Next, the operation of the comparator 122 will be more specifically described.

The comparator 122 generates control signal $CS_1$ based on the signal BS supplied from the transmitting circuit 115, the transmission start time $t_S$ and the transmission end time $t_E$ input from the storage circuit 121, and the clock time ST input from the clock signal generator 13. The comparator 122 supplies the signal $CS_1$ to the selector 114.

When being informed that the transmitting path 14 is not busy by signal BS from the transmitting circuit 115, the comparator 122 compares the transmission start time $t_S$ and the transmission end time $t_E$ of the oldest data packet $P_i$ stored in the storage circuit 121 with the clock time ST. In the case where the clock time ST is past the transmission start time $t_S$, and the clock time ST is not past the transmission end time $t_E$, the comparator 122 determines that the data packet $P_i$ should be selected. Then, the comparator 122 outputs control signal $CS_1$ to the selector 114 so that the data packet $P_i$ is selected.

At the same time, the comparator 122 outputs control signal $CS_2$ to the storage circuit 121 so that the storage circuit 121 outputs the data packet $P_i$ to the selector 114, and relinquishes the previously output data packet $P_i$ and the transmission start time $t_S$ and the transmission end time $t_E$ thereof. Accordingly, after the data packet $P_i$ is output, the oldest packet in the storage circuit 121 is a data packet $P_{i+1}$.

In the case where the clock time ST is past the transmission end time $t_E$ of the data packet $P_i$, the comparator 122 outputs the control signal $CS_1$ to the selector 114 so that the vacant packet $V_k$ is selected. In addition, the comparator 122 outputs the control signal $CS_2$ to the storage circuit 121 so that the storage circuit 121 relinquishes the data packet $P_i$ and the time data (the transmission start time $t_S$ and the transmission end time $t_E$) of the data packet $P_i$. In the case where the clock time ST is before the transmission start time $t_S$ of the data packet $P_i$ (i.e., $ST<t_S$), the comparator 122 only outputs the control signal $CS_1$ to the selector 114 so that the vacant packet $V_k$ is selected.

As described above, when the transmitting path 14 is not busy, the selector 114 outputs the data packet $P_i$ or the vacant packet $V_k$ to the transmitting circuit 115 in accordance with the control signal $CS_1$ supplied from the comparator 122.

On the other hand, when the transmitting path 14 is busy (e.g., when signal BS is not output from the transmitting circuit 115), the comparator 122 signals the selector 114 such that neither the data packet $P_i$ nor the vacant packet $V_k$ is output from the selector 114. Therefore, in this example as well, the timing chart showing the packet arrangement on the transmitting path 14 is the same as that in FIG. 4.

As described above, the data packet generator 11c outputs the time data $TD_i$ (transmission start time $t_S$ and transmission end time $t_E$) in addition to the data packet $P_i$ to the storage circuit 121 of the packet transmitting circuit 12c, to that it is possible for the data packet generator 11c to generate the data packet $P_i$ regardless of the state of the transmitting path 14. Thus, the structure of the data packet generator 11c can be simplified, and the burden thereon can be reduced. Furthermore, for example, in the case where the packet generator 11c includes a computer or the like, it is unnecessary for the computer to monitor the state of the transmitting path 14 or the clock time ST, thus making it possible for the computer to perform other operations.

In this example, although the transmission start time $t_S$ and the transmission end time $t_E$ are generated as the time data $TD_i$, even when either one of the transmission start time $t_S$ or the transmission end time $t_E$ is used, it is unnecessary for the data packet generator 11c to monitor the clock time ST, thus obtaining the same effect as in this example.

In this example, in the case where the clock time ST is past the transmission end time $t_E$, the comparator 122 outputs control signal $CS_1$ to the selector 114 so that the vacant packet $V_k$ is selected. Alternatively, in the case where the clock time ST is past the transmission end time $t_E$, the following processing with respect to the data packet $P_i$ can be performed.

With respect to the oldest data packet $P_i$ in the storage circuit 121, when the clock time ST is past the transmission end time $t_E$, the comparator 122 compares the transmission start time $t_S$ and the transmission end time $t_E$ of the second oldest data packet $P_{i+1}$ with the clock time ST. In the case where the clock time ST is past the transmission start time $t_S$ of the data packet $P_{i+1}$, and the clock time ST is not past the transmission end time $t_E$ of the data packet $P_{i+1}$, the comparator 122 determines that the data packet $P_{i+1}$ should be selected. Then, the comparator 122 outputs control signal $CS_2$ to the storage circuit 121 so that the storage circuit 121 outputs the data packet $P_{i+1}$ to the selector 114, and the comparator 122 simultaneously outputs the control signal $CS_1$ to the selector 114 so that the selector 114 selects the data packet $P_{i+1}$. Thus, it is possible to enhance transmission efficiency of the data packet $P_i$.

Furthermore, in this example, by comparing the time data $TD_i$ of the oldest data packet $P_i$ stored in the storage circuit 121 with the clock time ST, the comparator 122 determines the packet ($P_i$ or $V_k$) to be output. This implies that the data packet $P_i$ which has been input earliest is accessed in accordance with the input order (time) of the data packet $P_i$ input to the storage circuit 121, and that the corresponding time data $TD_i$ thereof is used. Alternatively, it is possible that, by accessing the transmission start time $t_S$ stored in the storage circuit 121, and comparing the time data $TD_i$ of the packet data $P_i$ having the earliest transmission start time $t_S$ with the clock time ST, the packet ($P_i$ or $V_k$) to be output can be determined.

In this example, the data packet generator 11c generates the transmission start time $t_S$ as one of the time data $TD_i$. However, by setting the time at which the data packet generator 11c outputs the data packet $P_i$ as the transmission start time $t_S$ (i.e., setting a predetermined time interval after the time at which the data packet is generated as a period of time during which a data packet can be output), and specifying the transmission end time $t_E$, the cycle $C_j$ in which the data packet $P_i$ can be output can be determined.

EXAMPLE 5

Figure 11:
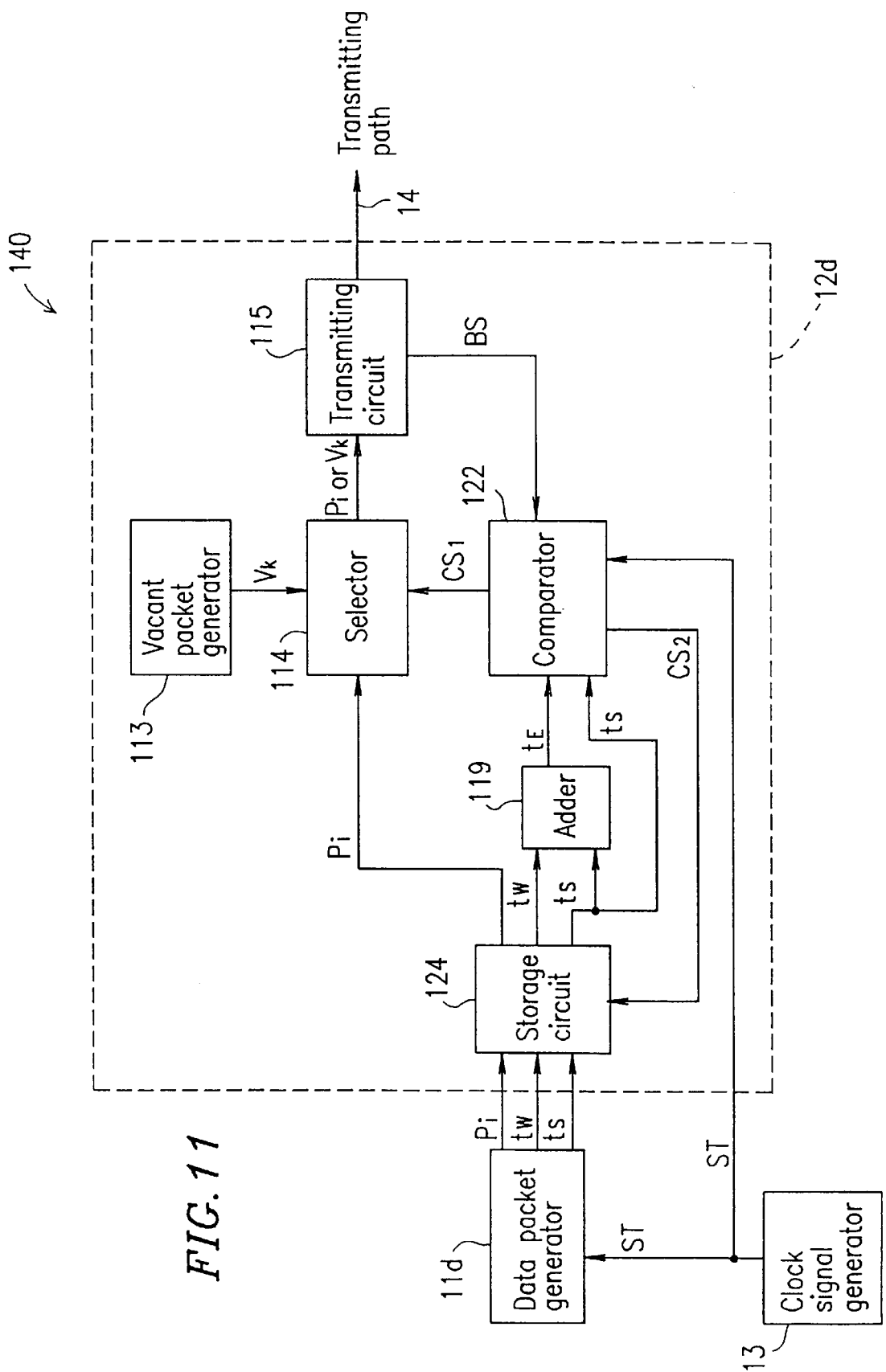
FIG. 11 is a block diagram illustrating a basic structure of a packet output device in Example 5 according to the present invention.

A packet output device 140 according to Example 5 of the present invention will be described with reference to FIG. 11. FIG. 11 is a block diagram showing the basic structure of the packet output device 140 of Example 5. The same components as in Examples 2 and 3 bear the same reference numerals. As shown in FIG. 11, the packet output device 140 includes a data packet generator 11d, a packet transmitting circuit 12d and a clock signal generator 13. The packet transmitting circuit 12d includes a vacant packet generator 113, a selector 114, a transmitting circuit 115, an adder 119, a comparator 122 and a storage circuit 124. The clock signal generator 13 is the same as the conventional clock signal generator 33, as in the case of the packet output devices according to Examples 1 to 4. The clock signal generator 13 outputs, for example, a clock signal for defining a clock time ST for the system of the packet output device 140. The clock time ST is supplied to the data packet generator 11d and the comparator 122 of the packet transmitting circuit 12d.

As shown in FIG. 11, the data packet generator 11d generates a data packet $P_i$ (i=1, 2, 3, . . . ) and time data $TD_i$ (transmission start time $t_S$ and transmission time width $t_W$) for specifying a time at which the data packet $P_i$ will be output based on the clock time ST. The data packet $P_i$, the transmission start time $t_S$ and the transmission time width $t_W$ are supplied to the storage circuit 124 of the packet transmitting circuit 12d. The storage circuit 124 stores the data supply $P_i$, the transmission start time $t_S$ and the transmission time width $t_W$ input thereto.

The comparator 122 outputs a control signal $CS_2$ to the storage circuit 124 so that the transmission start time $t_S$ and the transmission width $t_W$ of the oldest data packet $P_i$ stored in the storage circuit 124 are retrieved. The transmission start time $t_S$ is output to the comparator 122 and the adder 119, and the transmission time width $t_W$ is output to the adder 119. The adder 119 adds the transmission start time $t_S$ and the transmission time width $t_W$ supplied from the storage circuit 124 to generate the transmission end time $t_E$ and outputs the generated transmission end time $t_E$ to the comparator 122.

The comparator 122 compares the transmission start time $t_S$ and the input transmission end time $t_E$ input thereto with the clock time ST input from the clock signal generator 13 to determine which to output, the data packet $P_i$ or a vacant packet $V_k$. Based on this determination, the comparator 122 outputs the control signal $CS_1$ to control the selector 114 so that the selector 114 outputs the determined packet, the data packet $P_i$ or the vacant packet $V_k$, to the transmitting circuit 115.

Furthermore, when the comparator 122 determines that the data packet $P_i$ should be selected, the comparator 122 simultaneously outputs the control signal $CS_2$ to the storage circuit 124 so that the storage circuit 124 outputs the corresponding data packet $P_i$ to the selector 114. Furthermore, the vacant packet generator 113 generates the vacant packet $V_k$ showing the absence of data and outputs it to the selector 114.

The selector 114 outputs either one of the data packet $P_i$ or the vacant packet $V_k$ to the transmitting circuit 115, in accordance with the determination of the comparator 122, based on a control signal $CS_1$ supplied from the comparator 122. The transmitting circuit 115 outputs the data packet $P_i$ or the vacant packet $V_k$ input from the selector 114 to the transmitting path 14. Moreover, the transmitting circuit 115 informs the comparator 122 whether or not the packet can be output to the transmitting path 14 (i.e., whether or not the transmitting path 14 is busy) for each transmission cycle $C_j$ (by a signal BS). Signal BS can be, for example, a signal which is output only when the transmitting path 14 is not busy.

Next, the operation of the comparator 122 will be more specifically described.

The comparator 122 generates the control signal $CS_1$ based on the signal BS supplied from the transmitting circuit 115, the transmission start time $t_S$ input from the storage circuit 124, the transmission end time $t_E$ input from the adder 119 and the clock time ST input from the clock signal generator 13 so as to output the signal $CS_1$ to the selector 114.

When being informed that the transmitting path 14 is not busy by the signal BS from the transmitting circuit 115, the comparator 122 retrieves the transmission start time $t_S$ and the transmission time width $t_W$ of the oldest data packet $P_i$ stored in the storage circuit 124 to output to the adder 119. Then, the comparator 122 compares the retrieved transmission start time $t_S$ and the transmission end time $t_E$ output from the adder 119 with the clock time S. In the case where the clock time ST is past the transmission start time $t_S$, and the clock time ST is not past the transmission end time $t_E$, the comparator 122 determines that the data packet $P_i$ should be selected. Then, the comparator 122 outputs the control signal $CS_1$ to the selector 114 so that the data packet $P_i$ is selected.

At the same time, the comparator 122 outputs the control signal $CS_2$ to the storage circuit 124 so that the storage circuit 124 outputs the data packet $P_i$ to the selector 114, and relinquishes the previously output data packet $P_i$, the transmission start time $t_S$ and the transmission time width $t_W$ thereof. Accordingly, after the data packet $P_i$ is output, the oldest data packet in the storage circuit 124 is a data packet $P_{i+1}$.

In the case where the clock time ST is past the transmission end time $t_E$ of the data packet $P_i$, the comparator 122 outputs the control signal $CS_1$ to the selector 114 so that the vacant packet $V_k$ is selected. In addition, the comparator 122 outputs the control signal $CS_2$ to the storage circuit 124 so that the data packet $P_i$ and the time data (the transmission start time $t_S$ and the transmission time width $t_W$) of the data packet $P_i$ are relinquished. In the case where the clock time ST is before the transmission start time $t_S$, the comparator 122 outputs the control signal $CS_1$ to the selector 114 so that the vacant packet $V_k$ is selected.

As described above, when the transmitting path 14 is not busy, the selector 114 outputs the data packet $P_i$ or the vacant packet $V_k$ to the transmitting circuit 115 in accordance with the control signal $CS_1$ supplied from the comparator 122.

On the other hand, when the transmitting path 14 is busy (e.g., when the signal BS is not output from the transmitting circuit 115), the comparator 122 sends a signal $CS_1$ to the selector 114 controls such that neither the data packet $P_i$ nor the vacant packet $V_k$ will be output from the selector 114. Therefore, in this example as well, the timing chart showing the packet arrangement on the transmitting path 14 is the same as that in FIG. 4.

As described above, the data packet generator 11d outputs the time data $TD_i$ (transmission start time $t_S$ and transmission time width $t_W$) in addition to the data packet $P_i$ to the storage circuit 124 of the packet transmitting circuit 12d, so that it possible for the data packet generator 11d to generate the data packet $P_i$ regardless of the state of the transmitting path 14. Thus, the structure of the data packet generator 11d can be simplified, and the burden thereon can be reduced. Furthermore, for example, in the case where the packet generator 11c includes a computer or the like, it is unnecessary for the computer to monitor the state of the transmitting path 14 or the clock time ST, thus making it possible for the computer to perform other operations.

In this example, although the transmission start time $t_S$ and the transmission time width $t_W$ are generated as the time data $TD_i$, and the transmission end time $t_E$ is obtained by the adder 119, even when either one of the transmission start time $t_S$ and the transmission end time $t_E$ is used, it is unnecessary for the data packet generator 11d to monitor the clock time ST, thus obtaining the same effect as in this example.

In this example, in the case where the clock time ST is past the transmission end time $t_E$, the comparator 122 outputs the control signal $CS_1$ to the selector 114 so that the vacant packet $V_k$ is selected. Alternatively, in the case where the clock time ST is past the transmission end time $t_E$, the following processing with respect to the data packet $P_i$ can be performed.

With respect to the oldest data packet $P_i$ in the storage circuit 124, when the clock time ST is past the transmission end time $t_E$, the comparator 122 compares the transmission start time $t_S$ and the transmission end time $t_E$ of the second oldest data packet $P_{i+1}$ with the clock time ST. In the case where the clock time ST is between the transmission start time $t_S$ of the data packet $P_{i+1}$ and the transmission end time $t_E$ of the data packet $P_{i+1}$, the comparator 122 determines that the data packet $P_{i+1}$ should be selected. Then, the comparator 122 outputs the control signal $CS_2$ to the storage circuit 124 so that the storage circuit 124 outputs the data packet $P_{i+1}$ to the selector 114, and simultaneously outputs the control signal $CS_1$ to the selector 114 so that the selector 114 selects the data packet $P_{i+1}$. Thus, it is possible to enhance transmission efficiency of the data packet $P_i$.

Furthermore, in this example, by comparing the time data $TD_i$ of the oldest data packet $P_i$ stored in the storage circuit 124 with the clock time ST, the comparator 122 can determines the packet ($P_i$ or $V_k$) to be output. This implies that the data packet $P_i$ which has been input earliest to the storage circuit 124, and that the time data $TD_i$ thereof are used first. Alternatively, it is possible that, by accessing the transmission start time $t_S$ stored in the storage circuit 124 and comparing the time data $TD_i$ (transmission start time $t_S$ and transmission end time $t_E$) of the packet data $P_i$ having the earliest transmission start time $t_S$, with the clock time ST, the comparator 122 can determine the packet ($P_i$ or $V_k$) to be output.

In this example, the data packet generator 11d generates the transmission start time $t_S$ as one of the time data $TD_i$. However, by setting the time at which the data packet generator 11d outputs the data packet $P_i$ as the transmission start time $t_S$ (i.e., setting a predetermined time interval after the time at which the data packet is generated as a period of time during which a data packet can be output), and by specifying the transmission end time $t_E$, the cycle $C_j$ in which the data packet $P_i$ can be output can be determined.

In the case where transmission of the packet having a predetermined transmission time is performed by a computer or the like, it is possible to obtain the transmission start time and the transmission end time by calculation of a CPU. However, it is difficult for the CPU to monitor the time for transmitting packets to the transmitting path because it requires constant processing in a predetermined cycle (typically, on the order of $\mu$s ec). Actually, in the case where the computer performs transmission of the packet while monitoring the transmitting path and the clock time, a large burden is imposed on the computer. By using the circuitry for transmitting packets according to Examples 1 to 5, it is possible to reduce the burden on the CPU and for the computer to easily perform transmission of a packet having a predetermined transmission time. In particular, the computer can transmit of the packets while performing other processing operations, thus improving the processing efficiency of the computer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A packet output device for formatting serial data into packets and for transmitting resulting data packets, the device comprising:

a clock signal generator for generating a clock signal defining clock time;

a data packet generator for generating each data packet and for generating time data corresponding to the data packet, the time data defining an output time of the data packet based on the clock time; and a packet transmitting circuit for receiving the data packet and the corresponding time data and for transmitting the data packet based on the corresponding time data in accordance with the clock time, wherein the time data generated by the data packet generator includes a transmission start time before which the corresponding data packet is prevented from being transmitted, and a transmission end time after which the corresponding data packet is prevented from being transmitted; and wherein the packet transmitting circuit compares the clock time with the transmission start time and the transmission end time of the time data, in case where the clock time is before the transmission start time, a vacant packet for indicating absence of data to be transmitted is output, and in case where the clock time is between the transmission start time and the transmission end time, the data packet is output.

2. A packet output device for formatting serial data into packets and for transmitting resulting data packets, the device comprising:

a clock signal generator for generating a clock signal defining clock time;

a data packet generator for generating each data packet and for generating time data corresponding to the data packet, the time data defining an output time of the data packet based on the clock time; and a packet transmitting circuit for receiving the data packet and the corresponding time data and for transmitting the data packet based on the corresponding time data in accordance with the clock time, wherein the time data generated by the data packet generator includes a transmission start time before which the corresponding data packet is prevented from being transmitted, and a transmission time width starting from the transmission start time during which the corresponding data packet can be transmitted; and wherein the packet transmitting circuit compares the clock time with the transmission start time and the transmission time width of the time data, in case where the clock time is before the transmission start time, a vacant packet for indicating absence of data to be transmitted is output, and in case where the clock time is between the transmission start time and a time which is obtained by adding the transmission time width to the transmission start time, the data packet is output.

3. A packet output device for formatting serial data into packets and for transmitting resulting data packets, the device comprising:

a clock signal generator for generating a clock signal defining clock time;

a data packet generator for generating each data packet and for generating time data corresponding to the data packet, the time data defining an output time of the data packet based on the clock time; and a packet transmitting circuit for receiving the data packet and the corresponding time data and for transmitting the data packet based on the corresponding time data in accordance with the clock time, wherein the packet transmitting circuit comprises:
a vacant packet generator for generating a vacant packet for indicating absence of data to be transmitted;
a packet selector for receiving the data packet generated in the data packet generator and the vacant packet generated in the vacant packet generator, and selecting either one of the data packet or the vacant packet in accordance with the time data of the corresponding data packet and the clock time; and a transmitting circuit for transmitting one of the data packet and the vacant packet selected by the packet selector.

4. The packet output device according to claim 3, wherein the time data generated by the data packet generator includes a transmission start time before which the corresponding data packet is prevented from being transmitted, and a transmission end time after which the corresponding data packet is prevented from being transmitted; and wherein the packet selector compares the clock time with the transmission start time and the transmission end time of the time data, in case where the clock time is before the transmission start time, the vacant packet for showing absence of data to be transmitted is output, and in case where the clock time is between the transmission start time and the transmission end time, the data packet is output to the transmitting circuit.

5. The packet output device according to claim 3, wherein the time data generated by the data packet generator includes a transmission start time before which the corresponding data packet is prevented from being transmitted, and a transmission time width starting from the transmission start time during which the corresponding data packet can be transmitted; and wherein the packet transmitting circuit compares the clock time with the transmission start time and the transmission time width of the time data, in case where the clock time is before the transmission start time, the vacant packet for indicating absence of data to be transmitted is output, and in case where the clock time is between the transmission start time and a time which is obtained by adding the transmission time width to the transmission start time, the data packet is output to the transmitting circuit.

6. A packet output device for formatting serial data into packets and for transmitting resulting data packets, the device comprising:

a clock signal generator for generating a clock signal defining clock time;

a data packet generator for generating each data packet and for generating time data corresponding to the data packet, the time data defining an output time of the data packet based on the clock time; and a packet transmitting circuit for receiving the data packet and the corresponding time data and for transmitting the data packet based on the corresponding time data in accordance with the clock time, wherein the packet transmitting circuit comprises:
a packet storage circuit for temporarily storing the data packet and the corresponding time data output from the data packet generator;
a vacant packet generator for generating a vacant packet for showing absence of data to be transmitted;
a packet selector for receiving the data packet stored in the packet storage circuit and the vacant packet generated in the vacant packet generator, and selecting either one of the data packet and the vacant packet in accordance with the time data of the data packet stored in the packet storage circuit and the clock time; and
a transmitting circuit for transmitting a packet selected by the packet selector.

7. The packet output device according to claim 6, wherein the time data generated by the data packet generator includes a transmission start time before which the corresponding data packet is prevented from being transmitted, and a transmission end time after which the corresponding data packet is prevented from being transmitted; and the packet selecting means compares the clock time with the transmission start time and the transmission end time of the corresponding time data of the data packet stored in the storage means;

in case where the clock time is before the transmission start time, the vacant packet is output;

in case where the clock time is between the transmission start time and the transmission end time, the data packet is output to the transmitting circuit and further the data packet and the corresponding time data are deleted from the storage circuit; and in case where the clock time is past the transmission end time, the data packet and the corresponding time data are deleted from the storage means and the vacant packet is output.

8. The packet output device according to claim 6, wherein the time data generated by the data packet generator includes a transmission start time before which the corresponding data packet is not permitted to be transmitted, and a transmission time width starting from the transmission start time during which the corresponding data packet can be transmitted; and the packet transmitting circuit compares the clock time with the transmission start time and the transmission time width of the time data of the data packet stored in the storage means;

in case where the clock time is before the transmission start time, the vacant packet is output;

in case where the clock time is between the transmission start time and a time which is obtained by adding the transmission time width to the transmission start time, the data packet is output to the transmitting circuit, and further the data packet and the corresponding time data are deleted from the storage means; and in case where the clock time is past the time which is obtained by adding the transmission time width to the transmission start time, the data packet and the corresponding time data are deleted from the storage circuit and the vacant packet is output.

9. A packet output method for formatting serial data into packets and transmitting resulting data packets, the method comprising the steps of:

generating a clock signal defining clock time;

generating a data packet and time data corresponding to the data packet for defining an output time of the data packet based on the clock time; and transmitting the data packet based on the time data and the clock time, wherein the time data includes a transmission start time before which the corresponding data packet is not permitted to be transmitted, and a transmission end time after which the corresponding data packet is not permitted to be transmitted, and the packet transmitting step comprising the steps of:

comparing the clock time with the transmission start time and the transmission end time of the time data;

outputting a vacant packet for showing absence of data to be transmitted in case where the clock time is before the transmission start time; and outputting the data packet in case where the clock time is past the transmission start time and before the transmission end time.

10. A packet output method for formatting serial data into packets and transmitting resulting data packets, the method comprising the steps of:

generating a clock signal defining clock time;

generating a data packet and time data corresponding to the data packet for defining an output time of the data packet based on the clock time; and transmitting the data packet based on the time data and the clock time, wherein the time data includes a transmission start time before which the corresponding data packet is prevented from being transmitted, and a transmission time width starting from the transmission start time during which the corresponding data packet can be transmitted, and the packet transmitting step comprising the steps of:

comparing the clock time with the transmission start time and the transmission time width of the time data;

outputting a vacant packet for indicating absence of data to be transmitted in case where the clock time is before the transmission start time; and outputting the data packet in case where the clock time is past the transmission start time and before a time obtained by adding the transmission time width to the transmission start time.

11. A packet output method for formatting serial data into packets and transmitting resulting data packets, the method comprising the steps of;

generating a clock signal defining clock time;

generating a data packet and time data corresponding to the data packet for defining an output time of the data packet based on the clock time; and transmitting the data packet based on the time data and the clock time, wherein the packet transmitting step comprises the steps of:

generating a vacant packet for indicating absence of data to be transmitted;

selecting either one of the data packet and the vacant packet in accordance with the time data of the data packet and the clock time; and transmitting the selected packet.

12. The packet output method according to claim 11, wherein the time data includes a transmission start time before which the corresponding data packet is prevented from being transmitted, and a transmission end time after which the corresponding data packet is not permitted to be transmitted, the step of selecting comprising the steps of:

comparing the clock time with the transmission start time and the transmission end time of the time data;

outputting the vacant packet for indicating absence of data to be transmitted in case where the clock time is before the transmission start time; and outputting the data packet in case where the clock time is past the transmission start time and before the transmission end time.

13. The packet output method according to claim 11, wherein the time data includes a transmission start time before which the corresponding data packet is not permitted to be transmitted, and a transmission time width starting from the transmission start time during which the corresponding data packet can be transmitted, the step of selecting comprising the steps of:
  comparing the clock time with the transmission start time and the transmission time width of the time data;
  outputting vacant packet for showing absence of data to be transmitted in case where the clock time is before the transmission start time; and
  outputting the data packet in case where the clock time is between the transmission start time and a time which is obtained by adding the transmission time width to the transmission start time.

14. A packet output method for formatting serial data into packets and transmitting resulting data packets, the method comprising the steps of:
  generating a clock signal defining clock time;
  generating a data packet and time data corresponding to the data packet for defining an output time of the data packet based on the clock time; and
  transmitting the data packet based on the time data and the clock time,
  wherein the packet transmitting step comprises the steps of:
    temporarily holding the data packet generated in the data packet generating step and the corresponding time data;
    generating a vacant packet for indicating absence of data to be transmitted;
    selecting either one of the stored data packet and the vacant packet in accordance with the time data of the stored data packet and the clock time; and
    transmitting the selected packet.

15. The packet output method according to claim 14,
  wherein the time data generated includes a transmission start time before which the corresponding data packet is prevented from being transmitted, and a transmission end time after which the corresponding data packet is prevented from being transmitted, and
  the packet selecting step comprising the steps of:
    comparing the clock time with the transmission start time and the transmission end time of the time data of the stored data packet;
    outputting the vacant packet in case where the clock time is before the transmission start time;
    outputting the data packet to the transmitting circuit, and further deleting the data packet and the corresponding time data from the storage circuit in case where the clock time is past the transmission start time and before the transmission end time; and
    deleting the data packet and the corresponding time data which have been held in the holding step in case where the clock time is past the transmission end time.

16. The packet output method according to claim 14,
  wherein the time data includes a transmission start time before which the corresponding data packet is not permitted to be transmitted, and a transmission time width starting from the transmission start time during which the corresponding data packet can be transmitted; and
  the packet selecting step comprising the steps of:
    comparing the clock time with the transmission start time and the transmission time width of the time data of the stored data packet;
    outputting the vacant packet in case where the clock time is before the transmission start time;
    outputting the data packet, and deleting the data packet and the corresponding time data which have been held in the holding step in case where the clock time is between the transmission start time and a time which is obtained by adding the transmission time width to the transmission start time; and
    deleting the data packet and the corresponding time data which have been held in the holding step in case where the clock time is past the time which is obtained by adding the transmission time width to the transmission start time.

* * * * *